United States Patent
Mino et al.

(10) Patent No.: US 8,470,185 B2
(45) Date of Patent: Jun. 25, 2013

(54) PERPENDICULAR MAGNETIC RECORDING HEAD AND METHOD OF MANUFACTURING THE SAME

(75) Inventors: Tetsuya Mino, Hong Kong (CN); Naoto Matono, Hong Kong (CN); Ikuhito Onodera, Hong Kong (CN); Kazushi Nishiyama, Hong Kong (CN); Michitoshi Tsuchiya, Hong Kong (CN); Kenji Sasaki, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 513 days.

(21) Appl. No.: 12/457,060

(22) Filed: May 29, 2009

(65) Prior Publication Data
US 2010/0302681 A1 Dec. 2, 2010

(51) Int. Cl.
*G11B 5/10* (2006.01)
(52) U.S. Cl.
USPC ..... 216/22; 216/39; 360/125.03; 360/125.02; 29/603.15; 29/603.18
(58) Field of Classification Search
USPC .. 216/22, 39; 360/125.03, 125.02; 29/603.15, 29/603.18
See application file for complete search history.

(56) References Cited

U.S. PATENT DOCUMENTS

| | | | | |
|---|---|---|---|---|
| 8,339,737 | B2* | 12/2012 | Mino et al. | 360/125.03 |
| 2006/0077590 | A1* | 4/2006 | Sasaki et al. | 360/126 |
| 2009/0059426 | A1* | 3/2009 | Sasaki et al. | 360/125.02 |
| 2010/0078406 | A1* | 4/2010 | Guthrie et al. | 216/22 |
| 2012/0002326 | A1* | 1/2012 | Mino et al. | 360/123.12 |

FOREIGN PATENT DOCUMENTS

| | | |
|---|---|---|
| JP | 2004-348928 | 12/2004 |
| JP | 2005-190518 | 7/2005 |
| JP | 2007-257711 | 10/2007 |

\* cited by examiner

*Primary Examiner* — Lan Vinh
*Assistant Examiner* — David Kaufman
(74) *Attorney, Agent, or Firm* — Nixon & Vanderhye PC (57) ABSTRACT

A method of manufacturing a perpendicular magnetic write head capable of precisely narrowing a side gap is provided. A tip portion having a cross sectional geometry of an inverted trapezoid is formed in an opening portion of a non-magnetic layer and thereafter, the non-magnetic layer is etched with the tip portion as a mask. Thereby, a portion adjacent to the tip portion in a writing track width direction remains and an outermost edge portion of the tip portion in that direction is located on a plane which coincides with an etching face (side face) of the non-magnetic layer. When a gap layer is formed with a vapor phase growth such as a sputtering method to cover the side face of the non-magnetic layer and thereafter a side shield layer is formed adjacently to the tip portion therethrough, a thickness of the gap layer becomes extremely thin and is reproduced precisely. Therefore, the side gap is narrowed with high precision.

6 Claims, 7 Drawing Sheets

PERPENDICULAR MAGNETIC RECORDING HEAD AND METHOD OF MANUFACTURING THE SAME

BACKGROUND OF THE INVENTION

1. Field of the Invention

The present invention relates to a perpendicular magnetic write head provided with a magnetic pole and a side shield layer, and a method of manufacturing the same.

2. Description of the Related Art

In recent years, it is required to improve the performance of a magnetic write head because of the increasing writing density of a magnetic recording medium such as a hard disk (hereinafter referred to as "recording medium"). Accordingly, a perpendicular magnetic write head in which a signal magnetic field is set in a direction perpendicular to a recording surface of the recording medium attracts attention. This is because the advantages that a linear recording density becomes high, and that data written into the recording medium is less affected by the influence of heat fluctuation are obtained.

The perpendicular magnetic write head is provided with a thin film coil that generates a magnetic flux, and so on, together with a main magnetic pole layer. The main magnetic pole layer includes a tip part (magnetic pole) of a microscopic width that generates a writing magnetic field (perpendicular magnetic field). These days, it is also under review to provide a side shield layer adjacently to the magnetic pole in a writing track width direction via a gap layer, in order to achieve higher recording density by suppressing the generation of side-track erasure.

As for a method of manufacturing such perpendicular magnetic write head, a method of forming a side shield layer with a photolithography method and an etching method is proposed (for example, see Japanese Patent Application Publication No. 2007-257711). In this method, after forming a non-magnetic layer at first, a photoresist pattern is formed on the non-magnetic layer by means of a photolithography method. Subsequently, the non-magnetic layer is etched with the photoresist pattern as a mask to form a narrow opening portion and a wide opening portion located separately therefrom. Finally, a magnetic pole and a side shield layer are formed, at a time, in the narrow opening portion and the wide opening portion respectively.

Here, in the perpendicular magnetic write head provided with the side shield layer, a gap (side gap) between the magnetic pole and the side shield layer has a big influence on the writing performance. It is because the quantity of magnetic flux taken into the side shield layer varies depending on the size of the side gap. Thus it is required that the thickness of the side gap be formed as narrow as possible and be strictly controlled in order to be more adaptable to the further improving high recording density.

However, in the existing method of manufacturing the perpendicular magnetic write head, the length of the side gap is affected by the resolution of photolithography method. In this case, since there is a limitation in a patterning width, the length of the side gap is also limited naturally. Moreover, since the actual length of the side gap is determined by the accuracy of the etching, the length of the side gap varies due to the error of the etching amount and so on.

SUMMARY OF THE INVENTION

The present invention has been made in view of the above-described problems, and an object of the present invention is to provide a perpendicular magnetic write head capable of narrowing a side gap with high precision, and a method of manufacturing the same.

A method of manufacturing a perpendicular magnetic write head of the present invention includes: forming on a substrate a non-magnetic layer having an opening portion which is larger on a side far from the substrate than on a side close to the substrate; forming a magnetic pole in the opening portion; and etching the non-magnetic layer with the magnetic pole as a mask to allow a portion of the non-magnetic layer to remain, the portion of the non-magnetic layer being adjacent to the magnetic pole in a direction of writing track width.

A perpendicular magnetic write head of the present invention comprises: a magnetic pole formed on a substrate and having a width which is larger on a side far from the substrate than on a side close to the substrate; a non-magnetic layer formed so as to be adjacent to the magnetic pole in a direction of writing track width, and having a side face which coincides with a plane where an outermost edge of the magnetic pole in the direction of writing track width is located; a gap layer formed so as to cover at least the side face of the non-magnetic layer; and a side shield layer formed so as to be adjacent to the magnetic pole in the direction of writing track width with the gap layer in between.

According to the perpendicular magnetic write head or the method of manufacturing the same of the present invention, the magnetic pole having the width which is larger on the side far from the substrate than on the side close to the substrate is formed in the opening portion of the non-magnetic layer formed on the substrate, and then the non-magnetic layer is etched with the magnetic pole as a mask. Thereby, the portion adjacent to the magnetic pole in the direction of writing track width remains, and the outermost edge of the magnetic pole in that direction is located in the plane which coincides with the side face of the non-magnetic layer. In this case, a thickness of the gap layer becomes extremely thin and is reproduced precisely, when the gap layer is formed to cover the remaining portion (side face) of the non-magnetic layer with a vapor phase growth such as a sputtering process and thereafter, the side shield layer is formed to be adjacent to the magnetic pole therethrough. Moreover, the thickness of the gap layer can be more uniform with ease because it is less subject to the influence of the configuration of the magnetic pole having the width which is larger on the side far from the substrate than the side close to the substrate. As a result, since the thickness of the gap layer is decreased and its reproducibility is increased, the side gap can be narrowed with high precision.

DETAILED DESCRIPTION OF THE PREFERRED EMBODIMENTS

An embodiment of the invention will be described in detail hereinbelow with reference to the drawings.

Figure 1A:
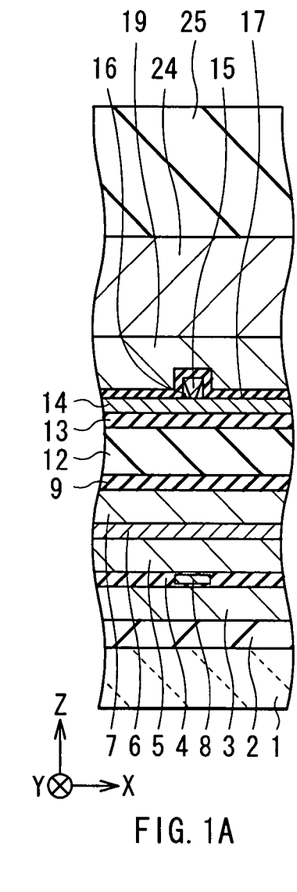
FIG. 1 is a sectional view illustrating a configuration of a thin film magnetic head provided with a perpendicular magnetic write head according to an embodiment of the present invention.
Figure 1B:
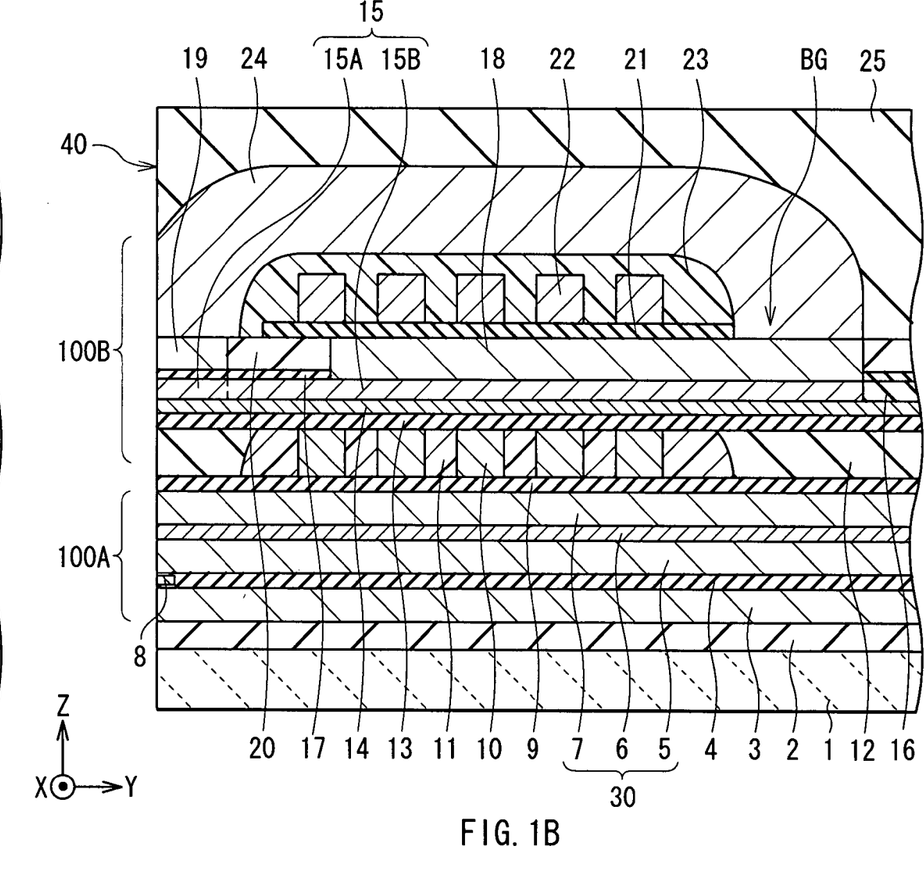

First, description will be made on a configuration of a thin film magnetic head provided with a perpendicular magnetic write head according to an embodiment of the present invention. FIG. 1 illustrates a sectional configuration of the thin film magnetic head, in which (A) illustrates a cross section parallel to an air bearing surface 40, and (B) illustrates a cross section perpendicular to the air bearing surface 40, respectively.

In the following description, dimensions in X, Y and Z directions represented in FIG. 1 are defined as "width", "length" and "thickness" respectively. In addition, a side closer to the air bearing surface 40 in the Y-axis is defined as a "front side", and a side far therefrom is defined as a "rear side" respectively. Further, if a state of a recording medium (not illustrated) moving relatively with respect to the thin film magnetic head is considered as a stream, a side ahead of the stream is defined as a "trailing side", and a side behind the stream is defined as a "leading side". These definitions also apply to FIG. 2 and after, which will be hereinafter described.

The thin film magnetic head to be described here applies a magnetic processing to the recording medium such as a hard disk, and is, for example, a combined head that can execute both of write and read processings.

In the thin film magnetic head, an insulating layer 2, a read head section 100A executing the read processing by means of a magneto-resistive effect (MR: magneto-resistive effect), a separating layer 9, a write head section 100B executing the write processing of a perpendicular magnetic write type, and an overcoat layer 25 are stacked in order on a substrate 1, for example.

The substrate 1 is made of a ceramic material such as AlTic ($Al_2O_3.TiC$), for example. The insulating layer 2, the separating layer 9, and the overcoat layer 25 are made of a nonmagnetic insulation material such as aluminium oxide ($Al_2O_3$; hereinafter referred to as "alumina"), for example.

In the read head section 100A, a lower read shield layer 3, a shield gap layer 4, and an upper read shield layer 30 are stacked in this order. A read element (MR element 8) is embedded in the shield gap layer 4 with one end thereof exposed on the air bearing surface 40.

The lower read shield layer 3 is made of a magnetic material such as nickel iron alloy (NiFe), for example. As the nickel iron alloy, there is, for example, a "permalloy" (trade name), having a nickel content of eighty weight percent and an iron content of twenty weight percent, etc. In the upper read shield layer 30, a non-magnetic layer 6 is sandwiched with upper read shield layer portions 5 and 7. The upper read shield layer portions 5 and 7 are made of a magnetic material such as permalloy, for example, and the non-magnetic layer 6 is made of a nonmagnetic conductive material such as ruthenium (Ru) or a nonmagnetic insulation material such as alumina, for example.

The shield gap layer 4 is made of a nonmagnetic insulation material such as alumina, for example. The MR element 8 utilizes a giant magneto-resistive effect (GMR: giant magneto-resistive effect) or a tunneling magneto-resistive effect (TMR: tunneling magneto-resistive effect) etc., for example.

In the write head section 100B, a first thin film coil 10 embedded by insulating layers 11 to 13, a non-magnetic layer 14, a main magnetic pole layer 15, a non-magnetic layer 16, a gap layer 17, an auxiliary magnetic pole layer 18, a write shield layer 19, an insulating layer 20, a second thin film coil 22 embedded by insulating layers 21 and 23, and a return yoke layer 24 are stacked in this order.

The thin film coil 10 is made of a high conductivity material such as copper (Cu) for example, and has a structure in which the thin film coil is wound around a back gap BG (spiral structure).

The insulating layer 11 is made of a nonmagnetic insulation material such as photoresist or spin on glass (SOG: Spin On Glass) exhibiting fluidity at the time of heating, for example, and the insulating layers 12 and 13 are made of a nonmagnetic insulation material such as alumina, for example.

The non-magnetic layer 14 is made of a nonmagnetic conductive material such as nickel chrome alloy (NiCr) or a nonmagnetic insulation material such as alumina, for example.

The main magnetic pole layer 15 extends backward from the air bearing surface 40, and is made of, for example, a magnetic material having high saturation flux density such as an iron-based alloy. As the iron-based alloy, there is, for example, an iron cobalt alloy (FeCo) or a cobalt iron nickel alloy (CoFeNi). The main magnetic pole layer 15 includes a tip portion 15A having a definite width that defines the width of a writing track and a rear end portion 15B having a wider width than the definite width in this order from the air bearing surface 40, for example. The tip portion 15A is a portion to substantially generate a perpendicular magnetic field (magnetic pole).

The non-magnetic layer 16 and the gap layer 17 are made of a nonmagnetic insulation material such as alumina, for example. Detailed configuration of the non-magnetic layer 16 will be mentioned later.

The auxiliary magnetic pole layer 18 is made of similar magnetic material as the main magnetic pole layer 15, for example. This auxiliary magnetic pole layer 18 extends backward from a position recessed from the air bearing surface 40 in the trailing side of the main magnetic pole layer 15, and is connected to the main magnetic pole layer 15 on the side far from the air bearing surface 40.

The write shield layer 19 extends backward from the air bearing surface 40 in the trailing side of the main magnetic pole layer 15 while neighboring the gap layer 17, and is made of similar magnetic material as the main magnetic pole layer 15, for example.

The insulating layer 20 is formed between the auxiliary magnetic pole layer 18 and the write shield layer 19, and is made of a nonmagnetic insulation material such as alumina, for example.

The material and configuration, etc., of the thin film coil 22 are similar to those of the thin film coil 10, for example.

The insulating layer 21 is made of similar nonmagnetic insulation material as the insulating layers 12 and 13, for example, and the insulating layer 23 is made of similar nonmagnetic insulation material as the insulating layer 11, for example. These insulating layers 21 and 23 are connected to the insulating layer 20, and the forefront edges of the insulating layers 21 and 23 are recessed from the forefront edge of the insulating layer 20.

The return yoke layer 24 extends backward from the air bearing surface 40 in the trailing side of the auxiliary magnetic pole layer 18 and the write shield layer 19, and is connected to the write shield layer 19 on the front portion thereof while connected to the auxiliary magnetic pole layer 18 on the back-gap BG. The return yoke layer 24 is made of similar magnetic material as the main magnetic pole layer 15, for example.

Figure 2:
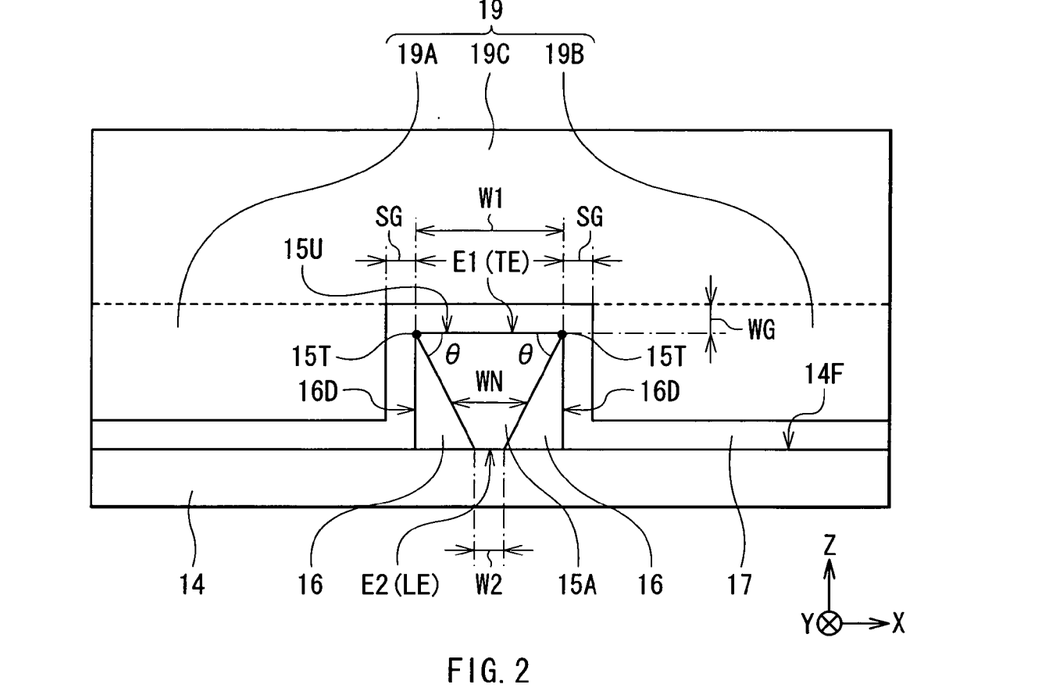
FIG. 2 is an enlarged view illustrating an end face configuration in an air bearing surface as a principal portion of the thin film magnetic head.

Subsequently, detailed configuration of the thin film magnetic head will be explained. FIG. 2 is an enlarged view illustrating the end face configuration of the air bearing surface 40 as a principal portion of the thin film magnetic head illustrated FIG. 1.

The tip portion 15A of the main magnetic pole layer 15, the non-magnetic layer 16 and the gap layer 17 are formed on the non-magnetic layer 14 as a substrate.

The tip portion 15A has a width which is larger on a side far from the non-magnetic layer 14 than on a side close thereto. For this reason, a shape of the end face of the tip portion 15A has an end edge E1 (trailing-edge TE) located on the trailing side, and an end edge E2 (leading edge LE) located on the leading side, for example, and the width W1 of the end edge E1 is larger than the width W2 of the end edge E2.

In the end face of the tip portion 15A, when the widths W1, W2 and a width "WN" of an arbitrary position between the end edge E1 and the end edge E2 are compared, the width W1 is larger than the width W2, and the width W1 is equal to or larger than the width "WN". The width W2 may be larger than zero, or may be substantially zero. When the width W2 is larger than zero, that means the shape of the end face is a shape in which the end edge E2 is one side, while when the width W2 is substantially zero, that means the shape of the end face is a shape in which the end edge E2 is a vertex of angular portions. The cross sectional geometry of the tip portion 15A may be either the same as that of the shape of the end face or different therefrom.

Here, the shape of the end face of the tip portion 15A is an inverted trapezoid where the edge E1 is the upper base (long side) and the edge E2 is the lower base (short side), for example. Bevel angle θ (angle of gradient of the side ends) of the end face is not limited in particular.

The non-magnetic layer 16 is adjacent to the tip portion 15A in the writing track width direction (direction of X axis), and has a side face 16D on the side not adjacent to the tip portion 15A. The outermost edge portions 15T, in the writing track width direction, of the end portion 15A are located on a plane including the side faces 16D (coincides with the plane of the side faces 16D). Here, although the side face 16D may be slanted off a surface plane 14F of the non-magnetic layer 14, it is preferable that the slanted angle be as small as possible, and it is more preferable that the side face 16D be perpendicular to the surface plane 14F. It is because that can facilitate the thickness control of the gap layer 17 in the manufacturing process of the thin film magnetic head.

The gap layer 17 is formed to cover the side faces 16D of the non-magnetic layer 16, and further covers also the upper surface 15U of the tip portion 15A and the surface plane 14F of the non-magnetic layer 14.

The write shield layer 19 includes side shield layers 19A and 19B provided adjacently to the tip portion 15A in the writing track width direction via the gap layer 17, and a trailing shield layer 19C provided on the trailing side of the tip portion 15A. Here, the side shield layers 19A and 19B and the trailing shield layer 19C are integrated, for example. The "integrated" means that the side shield layers 19A and 19B and the trailing shield layer 19C are formed in the same production process, and they are in an undetachable state. However, the side shield layers 19A and 19B and the trailing shield layer 19C may not be integrated, and they may be formed to be detachable in separate production processings. Here, in FIG. 2, the boundary zone of the side shield layers 19A and 19B and the trailing shield layer 19C is denoted with a broken line.

Here, the gap layer 17 functions as a magnetic gap between the end portion 15A and the write shield layer 19. In detail, the portion between the tip portion 15A and the side shield layers 19A and 19B defines the side gap SG, and the portion between the tip portion 15A and the trailing shield layer 19C defines a trailing gap (write gap WG).

The thin film magnetic head is operated as follows.

Upon writing information, when electric current flows into the thin film coil 22 of the write head section 100B and a writing magnetic flux is generated, the magnetic flux flows through the inside of the main magnetic pole layer 15 toward the tip portion 15A, and gathers in the vicinity of the trailing edge TE. When the magnetic flux is emitted outside to generate a perpendicular magnetic field, information is magnetically written on the recording medium with the perpendicular magnetic field.

In this case, a magnetic flux for leakage prevention is generated in the thin film coil 10 so that the writing magnetic flux becomes less likely to flow out into the read head section 100A. Thereby, the deterioration of the detecting accuracy in the MR element 8 is suppressed, and erasure of the information written in the recording medium due to unnecessary magnetic field generated in the lower read shield layer 3 and the upper read shield layer 30 is also suppressed. In addition, when the magnetic flux is emitted from the main magnetic pole layer 15, a part of that magnetic flux (spread components) is taken into the write shield layer 19, thereby suppressing diffusion of the perpendicular magnetic field and increasing the gradient. The magnetic flux taken into the write shield layer 19 is supplied again to the main magnetic pole layer 15 via the return yoke layer 24.

The magnetic flux emitted from the main magnetic pole layer 15 returns to the return yoke layer 24 via the recording medium, and is supplied again to the main magnetic pole layer 15. In this manner, the magnetic flux circulates between the write head section 100B and the recording medium, thereby establishing a magnetic circuit.

On the other hand, when a sense current flows into the MR element 8 of the read head section 100A at the time of reading the information, the resistance value of the MR element 8 changes in accordance with a signal magnetic field for the reading from the recording medium. Since such resistance change is detected as a voltage change, the information written on the recording medium is read magnetically.

Next, a method of manufacturing the thin film magnetic head will be explained. Here, since detailed description has been already made on materials, dimensions and configuration of the series of component elements, the description thereof will be omitted as needed. FIGS. 3 to 10 are for explaining a manufacturing process of the thin film magnetic head, and illustrate a cross-sectional configuration corresponding to that of FIG. 2.

The thin film magnetic head is manufactured by sequentially forming and stacking the series of component elements, mainly by means of the existing thin film process. The existing thin film process means, for example, a film formation technique such as a plating process or a sputtering process, a patterning technique such as a photolithography method, an etching technique such as a dry etching process or a wet etching process, and a polishing technique such as a chemical mechanical polishing (CMP: chemical mechanical polishing), etc.

Figure 3:
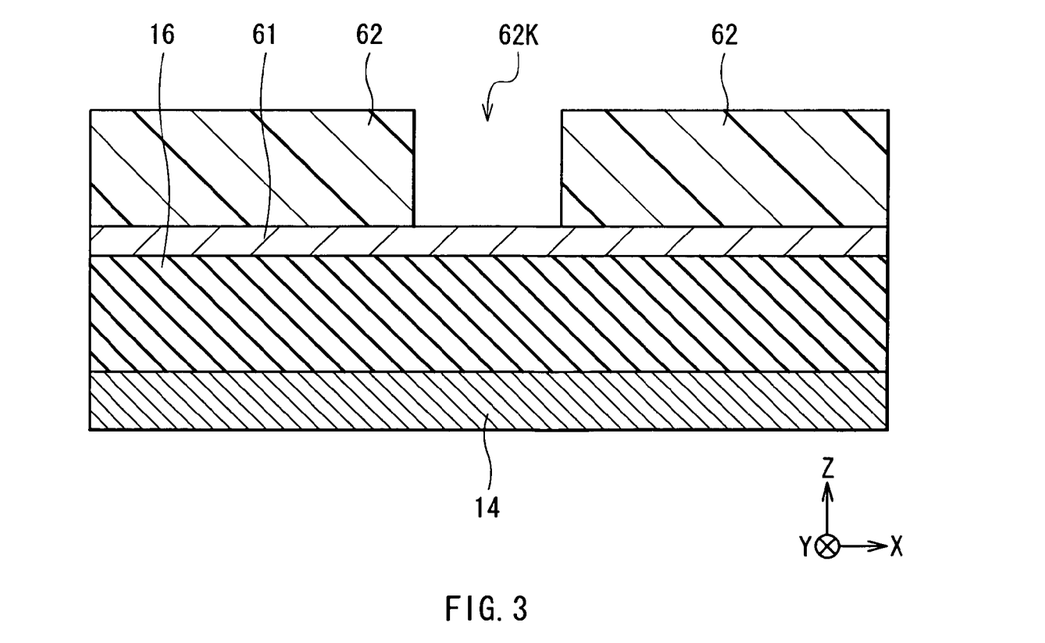
FIG. 3 is a sectional view to explain a manufacturing method of the principal portion of the thin film magnetic head.

When the principal portion of the thin film magnetic head is to be formed, a non-magnetic layer 14 is first formed by a sputtering process etc., as illustrated in FIG. 3. In this case, a nickel chrome alloy or the like is used for example so that the non-magnetic layer 14 is utilized as an etching stop layer when performing an etching process with a reactive ion etching (RIE: reactive ion etching) process etc., in the post-production process.

Subsequently, after forming the non-magnetic layer 16 on the non-magnetic layer 14 by a sputtering process etc., a mask layer 61 is formed on the non-magnetic layer 16 by a sputtering process etc. In this case, for example, a non-magnetic insulation material such as alumina is used as a formation material of the non-magnetic layer 16, and a metal material such as ruthenium or an alloy material such as nickel chrome alloy is used as a formation material of the mask layer 61.

Subsequently, a photoresist pattern 62 having an opening portion 62K is formed on the mask layer 61 by using a photolithography method. In this case, after applying a photoresist to the surface of the mask layer 61 to form a photoresist layer, for example, the photoresist layer is patterned (exposed and developed).

Figure 4:
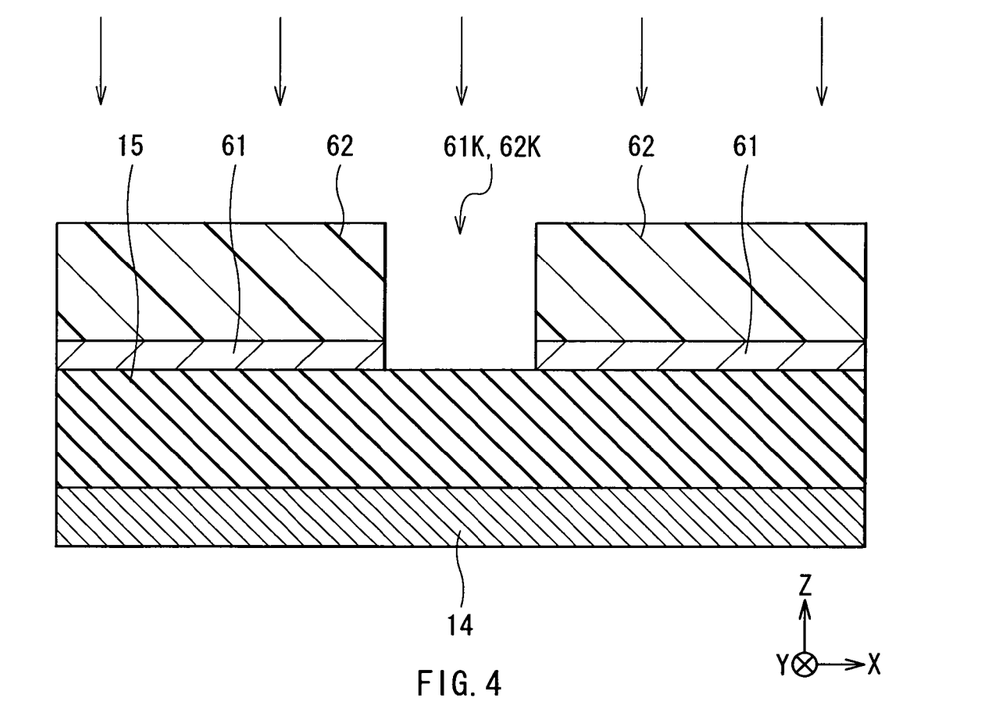
FIG. 4 is a sectional view to explain a step subsequent to that of FIG. 3.

Subsequently, as illustrated in FIG. 4, an opening portion 61K is formed by etching the mask layer 61 with an ion milling method etc., with the photoresist pattern 62 as a mask.

Figure 5:
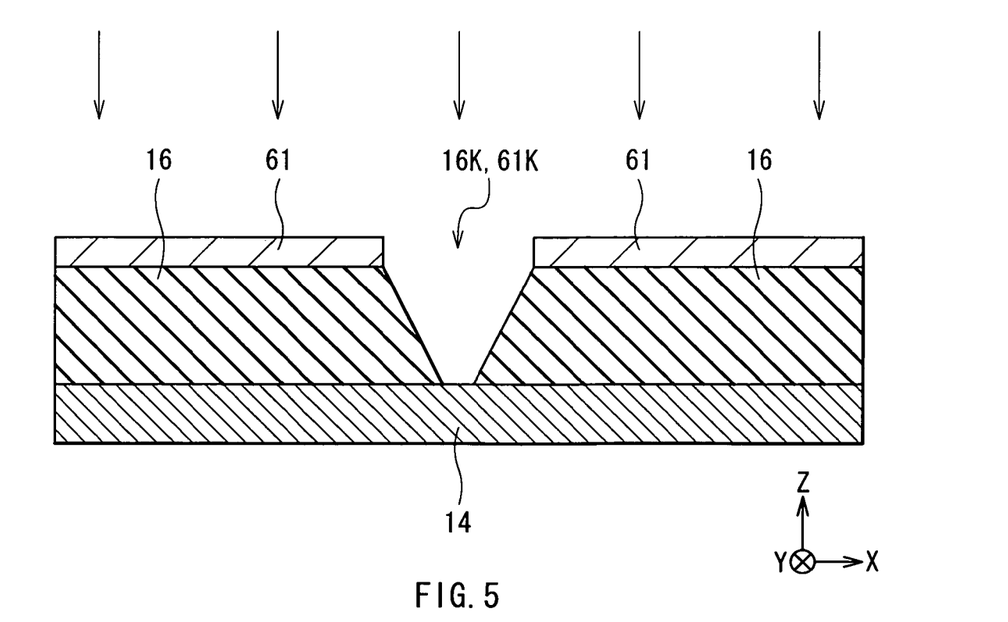
FIG. 5 is a sectional view to explain a step subsequent to that of FIG. 4.

Subsequently, as illustrated in FIG. 5, an opening portion 16K is formed such that the non-magnetic layer 14 is exposed by etching the non-magnetic layer 16 with the RIE process etc., after removing the photoresist pattern 62. In this case, since the non-magnetic layer 14 functions as the etching stop layer, the etching process is substantially completed at the time that the non-magnetic layer 14 is exposed, for example. In the etching process, since etched materials (shaved non-magnetic layer 16) are deposited as the etching process proceeds, the opening portion 16K becomes wider on the side far from the non-magnetic layer 14 than the side close thereto.

Figure 6:
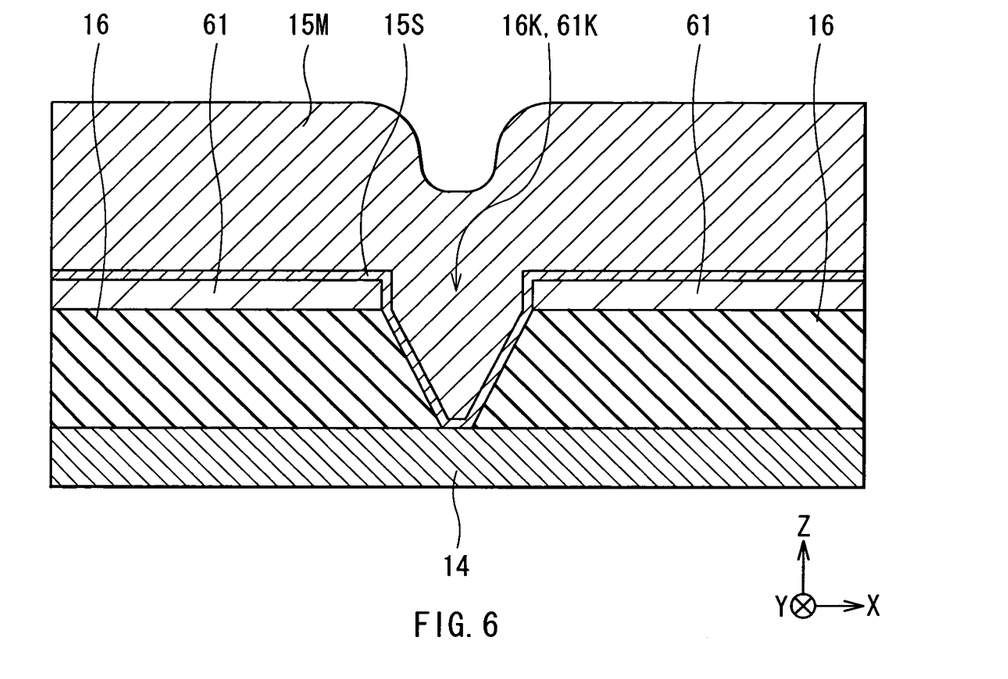
FIG. 6 is a sectional view to explain a step subsequent to that of FIG. 5.
Figure 7:
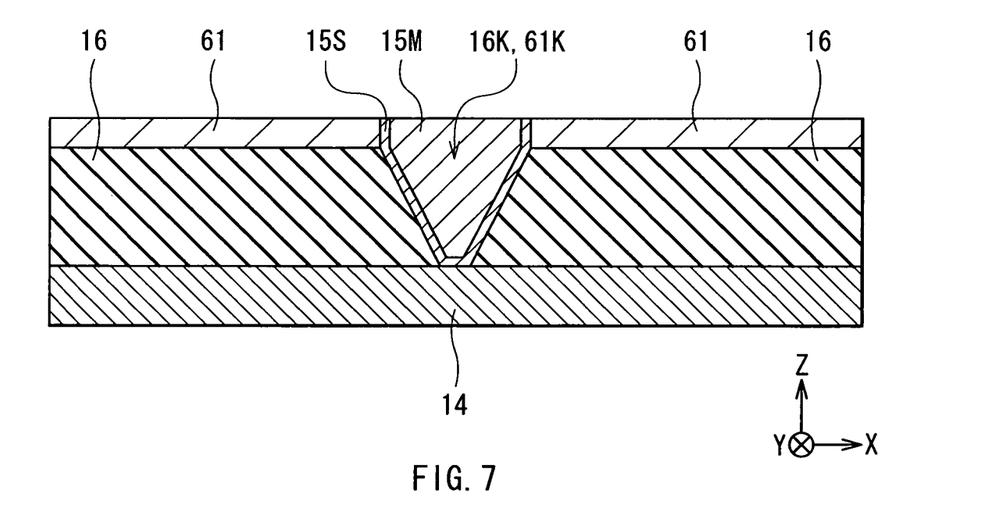
FIG. 7 is a sectional view to explain a step subsequent to that of FIG. 6.
Figure 8:
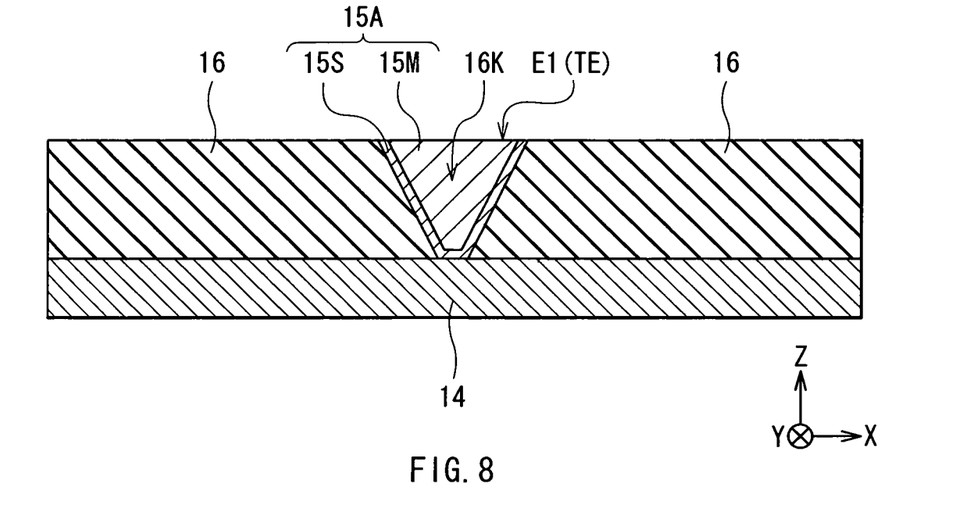
FIG. 8 is a sectional view to explain a step subsequent to that of FIG. 7.

Subsequently, the tip portion 15A is formed in the opening portion 16K as illustrated in FIGS. 6 to 8. A fabrication procedure of the tip portion 15A is, for example, as follows.

First, as illustrated in FIG. 6, a seed layer 15S is formed to cover the inner face of the opening portion 16K (the inner wall surface of the non-magnetic layer 16 and the exposed surface of the non-magnetic layer 14) and its periphery (the surface of the mask layer 61) with a sputtering process or the like. In this case, similar magnetic material as the main magnetic pole layer 15 is used, for example.

Subsequently, a metal coating layer 15M is grown with the seed layer 15S as an electrode film, so as to fill in the opening portion 16K. In this case, similar magnetic material as the main magnetic pole layer 15 is used, for example. Further, the thickness thereof is provided sufficiently to fill in not only the opening portion 16K but the opening portion 61K and further cover the seed layer 15S of their periphery, in order to planarize the metal coating layer 15M in the post-production process, for example.

Subsequently, the metal coating layer 15M is planarized by a CMP method etc., and only the portion embedded in the opening portions 16K and 61K is caused to remain, as illustrated in FIG. 7. In this case, a polishing process is performed until the mask layer 61 is exposed. The mask layer 61 may be polished excessively as necessary to ensure that the mask layer 61 is exposed.

Finally, as illustrated in FIG. 8, the mask layer 61 is removed by using an ion milling method etc., and only a portion of the seed layer 15S and a portion of the metal coating layers 15M embedded in the opening portion 16K are caused to remain. In this case, the etching process is performed until the non-magnetic layer 16 is exposed. An etching may be performed excessively to the non-magnetic layer 16 as necessary to ensure that the non-magnetic layer 16 is exposed.

In this manner, the tip portion 15A (the seed layer 15S and the metal coating layer 15M) illustrated in FIG. 2 is formed. Thereafter, the tip portion 15A may be partially etched from the trailing side as necessary with an ion milling method etc., so that thickness thereof is more decreased on the side close to the air bearing surface 40 than the side far therefrom. This is for concentrating the magnetic flux flowing through the inside of the tip portion 15A on the air bearing surface 40. In this case, the thickness of the tip portion 15A may be decreased gradually toward the air bearing surface 40 (taper formation), or may be decreased step-by-step (step formation).

Figure 9:
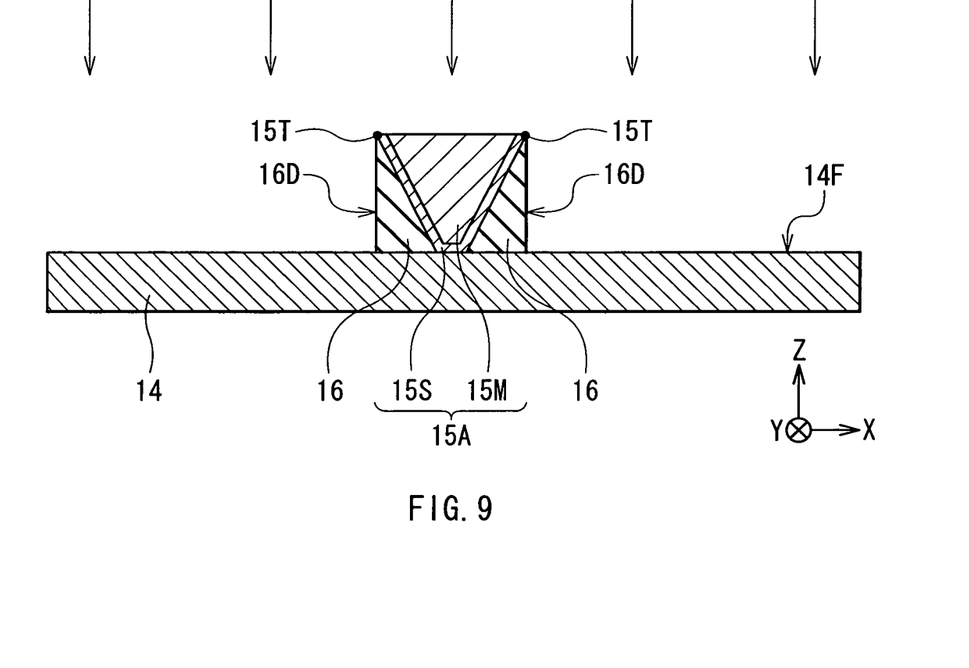
FIG. 9 is a sectional view to explain a step subsequent to that of FIG. 8.

Subsequently, as illustrated in FIG. 9, a portion adjacent to the tip portion 15A in the writing track width direction is remained by etching the non-magnetic layer 16 by using the RIE process etc., with the tip portion 15A as a mask. When using the RIE process, the type and composition of the etching gas, etc. are adjusted to control the selection ratio so that the etching rate of the tip portion 15A becomes significantly slower than the etching rate of the non-magnetic layer 16. In this case, since the non-magnetic layer 14 functions as the etching stop layer, the etching process is substantially completed at the time that the non-magnetic layer 14 is exposed.

In the etching process, the non-magnetic layer 16 is sufficiently etched in the periphery region of the tip portion 15A (a region out of the shade of the tip portion 15A) while the non-magnetic layer 16 is hardly etched in the vicinity region of the tip portion 15A (a region under the shade of the tip portion 15A). For this reason, the outermost edge portions 15T in the writing track width direction of the tip portion 15A are located on the plane which coincides with the etching surface (side faces 16D) of the non-magnetic layer 16. Also, when the selection ratio is optimized, the non-magnetic layer 16 is etched downwardly in a vertical direction in the region out of the shade of tip portion 15A, so that the side face 16D becomes almost perpendicular to the surface 14F of the non-magnetic layer 14. As a result, the cross sectional geometry of the integrated whole composed of the tip portion 15A and the non-magnetic layer 16 is virtually rectangular in shape.

Here, when etching the non-magnetic layer 16, other etching methods such as an ion milling method may be used instead of the RIE process. In this case, a mask such as a photoresist pattern may be formed on the tip portion 15A, and the non-magnetic layer 16 may thereafter be etched with the mask, for example.

Figure 10:
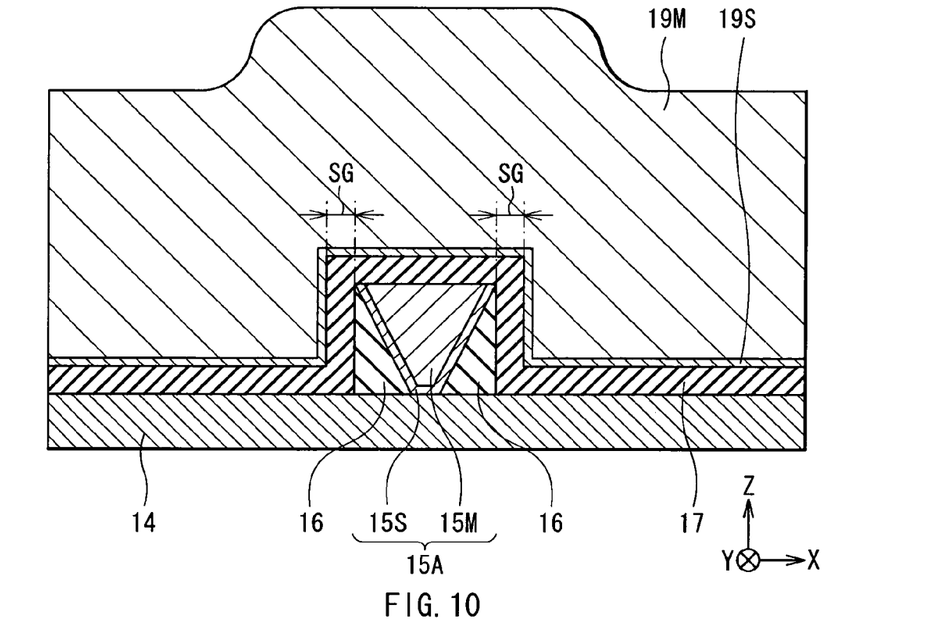
FIG. 10 is a sectional view to explain a step subsequent to that of FIG. 9.

Subsequently, the gap layer 17 is formed to cover the tip portion 15A and the non-magnetic layer 16 as well as their surrounding non-magnetic layer 14 with a vapor phase growth such as a sputtering method, as illustrated in FIG. 10. In this case, for example, an evaporation method, a chemical vapor deposition (CVD: chemical vapor deposition) method, or an atomic layer deposition (ALD: atomic layer deposition) method or the like may be used as long as it is the vapor phase growth.

Subsequently, the write shield layer 19 is formed on the gap layer 17 as illustrated in FIGS. 2 and 10. A procedure of forming the write shield layer 19 is as follows, for example.

First, a seed layer 19S is formed to cover the gap layer 17 with a sputtering process etc., as illustrated in FIG. 10. In this case, similar magnetic material as the write shield layer 19 is used, for example.

Subsequently, the metal coating layer 19M is grown with the seed layer 19S as an electrode film. In this case, similar magnetic material as the write shield layer 19 is used, for example. Also, the thickness thereof is provided sufficiently to fully embed the unevenness formed in the tip portion 15A and in its peripheries, in order to planarize the metal coating layer 19M in the post-production process, for example.

Finally, the metal coating layer 19M is planarized by using a CMP method etc., and the metal coating layer 19M is caused to remain in such a manner as to surround the tip portion 15A on three sides of: both sides in the writing track width direction; and the trailing side, via the gap layer 17, as illustrated in FIG. 2.

Thereby, since the write shield layer 19 (the seed layer 19S and the metal coating layer 19M) is formed, the side shield layers 19A and 19B and the trailing shield layer 19C are formed integrally.

In this case, the side gap SG is defined by the thickness of the gap layer 17 located between the tip portion 15A and the side shield layers 19A and 19B. In addition, the write gap WG is defined by the thickness of the gap layer 17 located between the tip portion 15A and the trailing shield layer 19C. Here, the side gap SG and the write gap WG become equal to each other, for example. As a result, the principal portion of the thin film magnetic head is completed.

Meanwhile, the side gap SG may differ from the write gap WG. Here, if it is intended to cause the side gap SG to be larger than the write gap WG, the gap layer 17 may be formed (with reference to FIG. 10) and a part of the gap layer 17 (portions other than the portion that covers the sidefaces 16D of the non-magnetic layer 16) may be removed by using an anisotropic etching process such as a RIE process, and thereafter, an additional gap layer (not illustrated) may be formed by similar fabrication procedure as the gap layer 17. In this case, since the side gap SG is determined by the total thickness of the gap layer 17 and the additional gap layer while the write gap WG is determined by the thickness of the additional gap layer, the side gap SG becomes larger than the write gap WG.

In the thin film magnetic head or the method of manufacturing the same according to the present embodiment, after forming the tip portion 15A having the width which is larger on the side far from the non-magnetic layer 14 than on the side close thereto in the opening portion 16K of the non-magnetic layer 16 formed on the non-magnetic layer 14, the non-magnetic layer 16 is etched with the tip portion 15A as a mask. Thereby, the portion of the non-magnetic layer 16 adjacent to the tip portion 15A in the writing track width direction remains, and the outermost edge portions 15T in that direction are located on the plane which coincides with the etching surface (side face 16D) of the non-magnetic layer 16.

In this case, the thickness of the gap layer 17 is controlled by utilizing the advantage of vapor phase growth method, when the gap layer 17 is formed to cover the remaining portion (side faces 16D) of the non-magnetic layer 16 by means of the vapor phase growth such as a sputtering process and thereafter, the side shield layers 19A and 19B are formed adjacently to the tip portion 15A therethrough. In the vapor phase growth method, since the deposition rate (quantity of deposition) of the formation material of the gap layer 17 is strictly controlled, the thickness thereof becomes extremely thin and accurately reproduced. Accordingly, the thickness of the gap layer 17 controlled by the vapor phase growth becomes precisely thinner than the case controlled by the photolithography method and etching method.

Also, since the gap layer 17 is formed after forming the non-magnetic layer 16 adjacently to the tip portion 15A in the writing track width direction, the range falling under the shade of the tip portion 15A in the case of forming the gap layer 17 by the vapor phase growth becomes narrower than the case where the non-magnetic layer 16 is not formed. Thereby, the thickness of the gap layer 17 may be more uniform with ease since it is less subject to the influence of the configuration of the tip portion 15A having the width which is larger on the side far from the non-magnetic layer 14 than the side close thereto.

The following is a detailed explanation of why the thickness of the gap layer 17 is uniformized. If the non-magnetic layer 16 is not formed in FIG. 9 as the step before the gap layer 17 is formed, the gap layer 17 becomes less likely to deposit in the space in which the non-magnetic layer 16 should have been formed when the gap layer 17 is deposited by the vapor phase growth, since that space is under the shade of the tip portion 15A as viewed form the depositing direction of the gap layer 17. In this case, the thickness of the gap layer 17 becomes uneven since there tends to be a difference in the deposition quantity between the region under the shade of the tip portion 15A and the region out of the shade. In contrast, when the non-magnetic layer 16 is formed, since the above-mentioned space under the shade of the tip portion 15A is filled with the non-magnetic layer 16, the gap layer 17 is deposited on the surface of the non-magnetic layer 16 (the region out of the shade of the tip portion 15A) with ease. In this case, since the difference in the deposition quantity between the surface of the non-magnetic layer 16 and the other regions is less likely to occur, the thickness of the gap layer 17 becomes uniform.

Therefore, since the thickness of the gap layer 17 is decreased and its reproducibility is increased, the side gap SG can be narrowed with high precision.

In particular, when the RIE process is used as the method for etching the non-magnetic layer 16 and the selection ratio between the tip portion 15A and the non-magnetic layer 16 is adjusted, the non-magnetic layer 16 is etched on a priority basis while the tip portion 15A is hardly etched. In this case, since the tip portion 15A functions as a mask at the time of etching, no other mask formation is necessary. Therefore, the etching of the non-magnetic layer 16 can be easily performed such that the portion adjacent to the tip portion 15A remains.

In addition, in the thin film magnetic head according to the present embodiment, when the tip portion 15A has the width which is large on the side far from the non-magnetic layer 14 than on the side close thereto, the non-magnetic layer 16 is adjacent to the tip portion 15A in the writing track width direction, and the outermost edge portions 15T in that direction of the tip portion 15A are located on the plane which coincides with the side faces 16D of the non-magnetic layer 16. Thereby, spread components of the magnetic flux emitted from the tip portion 15A are easily taken into the side shield layers 19A and 19B, since the side shield layers 19A and 19B come close to the tip portion 15A in the vicinity of the trailing edge TE which is the substantial writing portion. On the other hand, since the side shield layers 19A and 19B are away from the tip portion 15A in the vicinity of the leading edge LE that is not the substantial writing portion, the magnetic flux emitted from the tip portion 15A is less likely to be excessively taken into the side shield layers 19A and 19B. Therefore, it becomes possible to secure the intensity of the perpendicular magnetic field while increasing its gradient.

Meanwhile, although the plating method is used as the formation method of the tip portion 15A, it is not always limited thereto, and vapor phase growth method such as a sputtering method may be used. This also applies to the formation method of the write shield layer 19.

Figure 11:
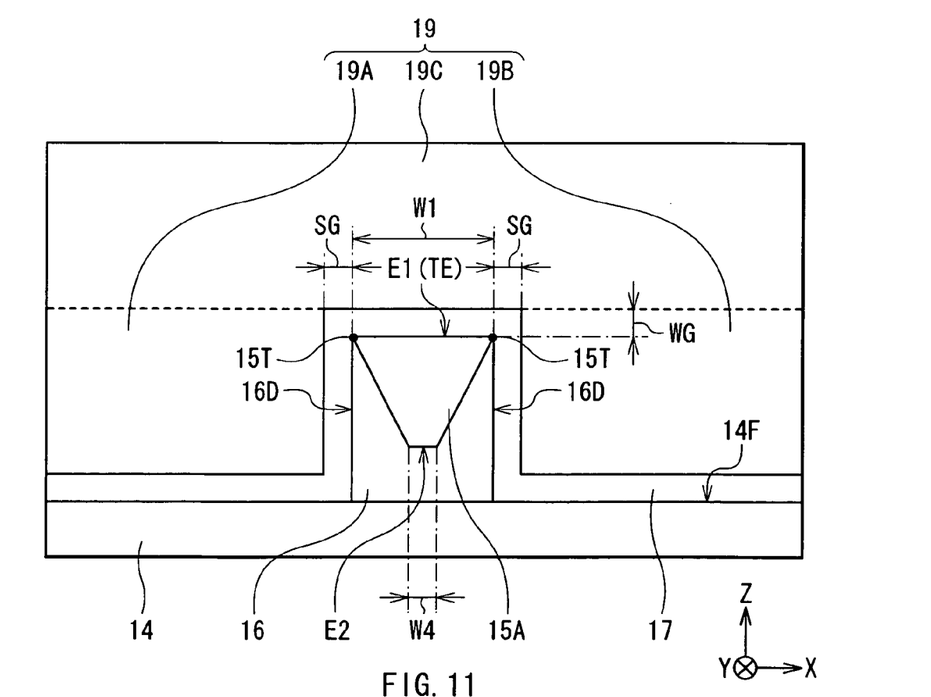
FIG. 11 is a sectional view illustrating a modification with regard to a configuration of the thin film magnetic head.

Also, although the tip portion 15A is configured adjacently to the non-magnetic layer 14 as illustrated FIG. 2, it is not necessarily limited thereto. For example, as illustrated in FIG. 11, the tip portion 15A may not be adjacent to the non-magnetic layer 14, and may be away from the non-magnetic layer 14 with the non-magnetic layer 16 in between. To form such tip portion 15A and the non-magnetic layer 16, the non-magnetic layer 16 may be etched so that the non-magnetic layer 14 does not expose at the time of etching the non-magnetic layer 16 (with reference to FIGS. 6 and 7), for example. In this case, a recess portion is formed in the non-magnetic layer 16, and the tip portion 15A is formed in the recess portion.

Figure 12:
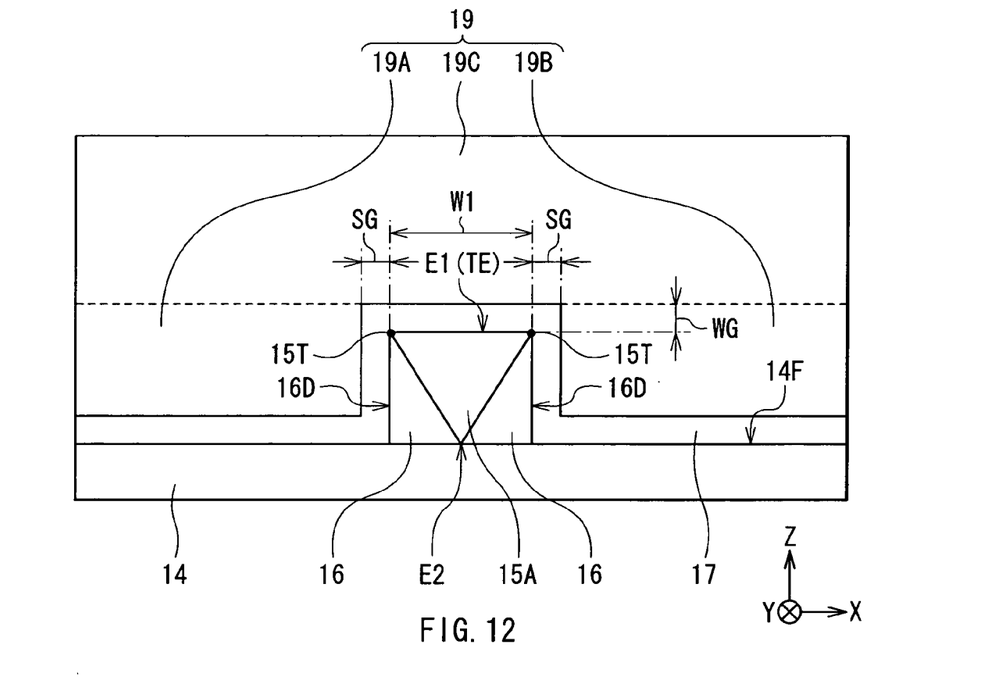
FIG. 12 is a sectional view illustrating another modification with regard to the configuration of the thin film magnetic head.
Figure 13:
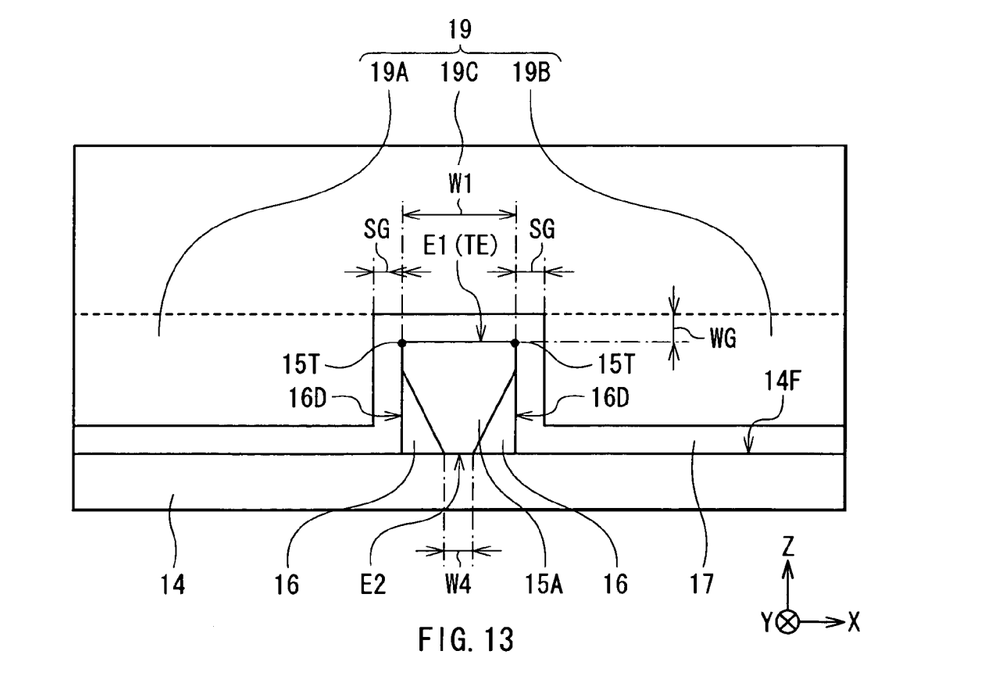
FIG. 13 is a sectional view illustrating still another modification with regard to the configuration of the thin film magnetic head.

Further, although the cross sectional geometry of the tip portion 15A is configured to be an inverted trapezoid as illustrated in FIG. 2, it is not necessarily limited thereto. For example, the cross sectional geometry of the tip portion 15A may be an inverted triangle as illustrated in FIG. 12, or a hexagon in which a rectangle and an inverted trapezoid are combined as illustrated in FIG. 13. To form the tip portion 15A illustrated in FIG. 12, for example, the non-magnetic layer 16 may be etched so that the opening portion 16K is sharpened at the bottom thereof by, for example, adjusting the selection ratio at the time of etching the non-magnetic layer 16 (with reference to FIGS. 4 and 5). To form the tip portion 15A illustrated in FIG. 13, for example, not only the non-magnetic layer 16 but also the tip portion 15A may be etched by, for example, adjusting the selection ratio at the time of etching the non-magnetic layer 16 (with reference to FIGS. 8 and 9). In this case, since the outermost edge portions 15T of the tip portion 15A draw back to inner side due to the etching, the width W1 of the trailing edge TE is narrowed.

As mentioned above, the present invention has been described with reference to the embodiment, but the present invention is not limited to the above-mentioned embodiment and various modifications are possible. For example, although, in the above-described embodiment, the perpendicular magnetic write head of the present invention is applied to a combined head, it is not necessarily limited thereto but may be applied to a write-only head that is not provided with the read head section.

What is claimed is:

1. A method of manufacturing a perpendicular magnetic write head, the method comprising:
   forming on a substrate a non-magnetic layer having an opening portion which is larger on a side far from the substrate than on a side close to the substrate;
   forming a magnetic pole in an inside of the opening portion so as to have a cross-sectional shape whose width of an upper end edge is larger than that of a lower end edge; and
   etching the non-magnetic layer only with the magnetic pole formed inside of the opening portion as a mask to allow a portion of the non-magnetic layer to remain, the portion of the non-magnetic layer being adjacent to the magnetic pole in a direction of writing track width, and to allow an outermost edge of the magnetic pole in a direction of writing track width to be located in a same plane with a side face of the non-magnetic layer.

2. The method of manufacturing the perpendicular magnetic write head according to claim 1, further comprising:
   forming a gap layer so as to cover at least the remaining portion of the non-magnetic layer; and
   forming a side shield layer so as to be adjacent to the magnetic pole in the direction of writing track width with the gap layer in between.

3. The method of manufacturing the perpendicular magnetic write head according to claim 1, further comprising allowing the build-up of shaved non-magnetic layer material to form a desired shape for the opening portion.

4. The method of manufacturing the perpendicular magnetic write head according to claim 1, further comprising:
   forming a tip portion of the magnetic pole in the opening portion; and
   partially etching the tip portion from a trailing side of the head so that a thickness thereof is smaller proximate to an air bearing surface as compared to a side remote therefrom.

5. The method of manufacturing the perpendicular magnetic write head according to claim 4, wherein the tip portion is tapered in shape.

6. The method of manufacturing the perpendicular magnetic write head according to claim 4, wherein the tip portion is step-shaped.

* * * * *